July 4, 1967

A. J. SIPIN 3,329,019

MASS FLOW METERING MEANS

Filed Oct. 26, 1964

INVENTOR.
Anatole J. Sipin

BY

July 4, 1967   A. J. SIPIN   3,329,019
MASS FLOW METERING MEANS
Filed Oct. 26, 1964   2 Sheets-Sheet 2

INVENTOR.
Anatole J. Sipin
BY

United States Patent Office 3,329,019
Patented July 4, 1967

3,329,019
MASS FLOW METERING MEANS
Anatole J. Sipin, 117 E. 77th St.,
New York, N.Y. 10021
Filed Oct. 26, 1964, Ser. No. 406,238
17 Claims. (Cl. 73—194)

This invention relates to a means for metering the mass flow of fluent matter such as liquids, gases and fluent solid material. The device requires no revolving parts in the flow path.

There is a widespread need for a metering device of this character that operates with minimum resistance to the flow without moving parts within the flow stream that could be attacked or could contaminate the flowing material. In the chemical process industries, for example, it is frequently necessary to combine corrosive fluids in accurately maintained weight ratios. In aircraft flight refueling, it is advantageous to measure the weight of fuel transferred at very high flow rates and very low pressure losses. In the food industry, it is of major importance that the metering device be of such material and construction that the fluid cannot be contaminated or trapped in corners and revolving parts, and that it can be easily cleaned. In the pipeline industry weight metering is superior to volumetric metering because changes in density would not introduce weight flow error.

One of the objects of this invention is to provide a device for measuring the mass flow of fluids or of fluent solids or of mixtures of these.

Another object of this invention is to provide a metering means with no revolving parts in the flow stream.

A third object of this invention is to provide a metering means with minimal obstruction in the flow path, and minimal resistance to flow.

A further object of this invention is to provide a metering means for rapidly measuring high rates of flow.

The invention is based on the principle that a fluid flowing through a straight conduit or tube and experiencing a velocity gradient transverse to the flow path will interact with the tube wall with a force directly related to the transverse velocity gradient and the mass flow rate. The magnitude and direction of the reaction force depends on the magnitude and direction of the transverse velocity change and the magnitude and direction of the mass flow. If two sections of the tube have opposite transverse velocity gradients a couple, consisting of equal and opposite reaction forces, will result. It is the principle of this invention that the reaction forces or their couple be measured as an indication of mass flow rate through the tube. Although a flowing "fluid" is described, it is to be understood that the principle holds equally well for fluent solids and mixtures. The features and advantages of several embodiments of the invention will be understood by reference to the following drawings.

Figure 1:
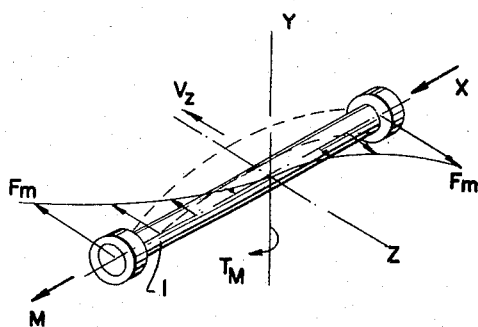
FIG. 1 is a three dimensional diagram of a flow tube section showing vectorial relationships among forces and velocities.

The diagram of FIGURE 1 shows a straight tube 1 with a flow path in the X–Z plane. For illustration of the principle it is assumed that the ends of the tubes are fixed and that the tube is vibrated in a fundamental bending mode as shown by the dotted line. For a steady vibration, the vibrational velocity of the tube in the Z-direction, $V_z$, has a distribution along the X-axis that is directly related to the displacement Z. Both the transverse displacement Z and the transverse velocity $V_z$ are maximum at a point midway between the fixed ends and zero at the ends. The transverse velocity gradient along the X-axis, however, is maximum at the ends and zero at the mid-point. The force on an elementary particle within the tube due to its transverse motion can be expressed as $$F_m = \frac{d(mV_z)}{dt}$$

where $m$ is the mass of the elementary particle. The equation can also be expressed as $$F_m = mV_x \frac{dV_z}{dx}$$

where $V_x$ is the flow velocity and $$\frac{dV_z}{dx}$$

the transverse velocity gradient along the X-axis. This force is directed in the positive Z direction between the inlet end of the tube and its mid-point, representing the inertial reaction of the particle to acceleration in the Z direction by the tube wall. The force is directed in the negative Z direction between the mid-point and the outlet end of the tube, representing the force exerted on the tube wall by the particle due to deceleration in the Z direction. The integrated reaction force due to acceleration of all the fluid particles between the tube entrance and its mid-point can be expressed as $F_{MU} = MZ_m$, where M is mass flow rate and $Z_m$ the transverse displacement at the mid-point. Similarly, the integrated force due to deceleration of all the fluid particles between the mid-point and the tube outlet is expressed as $F_{MD} = MZ_m$. Either force or both forces or torque $T_M$ due to their couple can be sensed as an indication of mass flow through the tube.

Figure 4:
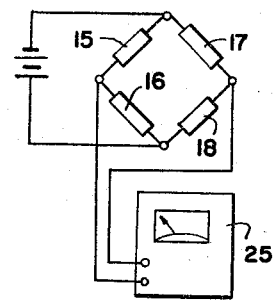
FIG. 4 is an electrical schematic diagram of the embodiment shown in FIG. 2.
Figure 3:
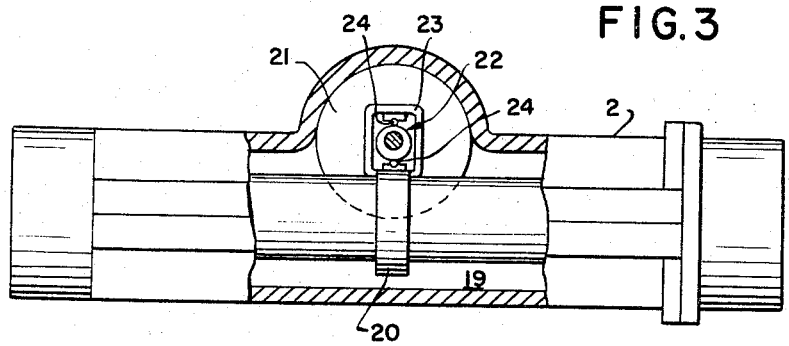
FIG. 3 is a partially sectional top view of the embodiment of FIG. 2.
Figure 2:
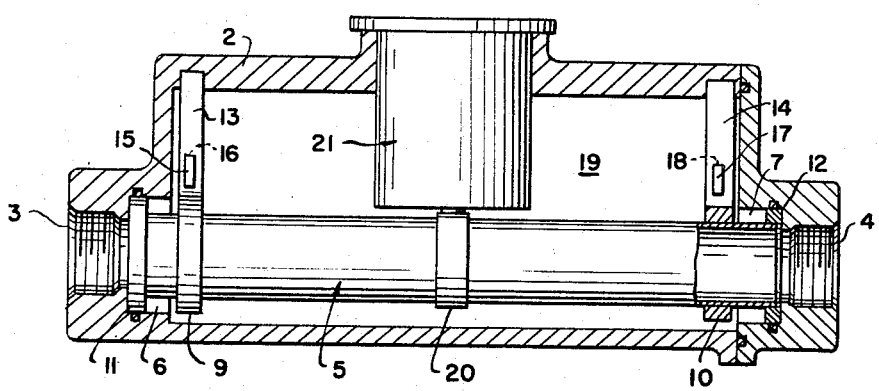
FIG. 2 is a partially sectioned side view of the preferred embodiment.

In the preferred embodiment of the invention shown in FIGS. 2, 3 and 4 a straight flexible flow tube is used, and the transverse velocity is obtained by lateral oscillation of the flow tube. Referring, now, to FIG. 2, the flowmeter includes a housing 2 with co-axial inlet and outlet ports 3 and 4. The ports communicate with the flow tube 5 through cylindrical passages 6 and 7. The end sections of the flow tube are co-axial with ports 3 and 4 and are mounted in bearings 9 and 10. The tips of the flow tube are bonded to the inner edges of annular rings 11 and 12, whose outer surfaces mate with the walls of passages 6 and 7. Bearings 9 and 10 are suspended by flat cantilever springs 13 and 14, which permit limited freedom of motion in the transverse direction of oscillation; that is, in a horizontal direction perpendicular to the flow path, as shown in FIG. 2. Strain gages 15 and 16 are mounted on opposite sides of flat spring 13; and strain gages 17 and 18 are mounted on opposite sides of flat spring 14. The function of the strain gages is to measure the reaction forces of the flow tube at bearings 9 and 10. The strain gages are connected electrically in a bridge circuit as shown in FIG. 4. Rings 11 and 12 or the sections of flow tube between the rings and bearings should have sufficient flexibility so that their distortion due to transverse motion of the flow tube does not cause significant restoring forces in comparison with the restoring forces of the flat springs.

Referring also to FIG. 3 it is seen that flow tube 5 is oscillated in chamber 19 of housing 6 by sleeve 20, which is driven by constant speed motor 21 through cam 22. Sleeve 20 is connected to flow tube 5 at the midpoint. Sleeve 20 is also attached to yoke 23, mounted horizontally and co-planar with the center line of flow tube 5. Cam 22 is mounted eccentrically on the shaft of motor 21 and drives yoke 23 through two ball followers 24.

When there is a force couple applied to bearings 9 and 10 by the flow tube due to oscillation of the mass flow, beams 13 and 14 will deflect in opposite directions and corresponding strain gages on each beam will change resistance values in opposite directions. Thus if the force couple were in a direction to make the resistance of strain gage 15 increase in value, gage 16 would decrease, gage 17 would decrease and gage 18 would increase. As shown in FIG. 4 there would be a voltage output from the strain gage bridge, at the frequency of oscillation with an amplitude directly proportional to mass flow rate. This voltage can be measured by a conventional vacuum tube voltmeter 25 suitably calibrated to indicate mass flow rate. It is to be noted that any forces applied to both bearings in the same direction, such as elastic forces due to deflection of the flow tube, will not be measured as their effect is cancelled by the arrangement of the strain gage bridge. The flowmeter is symmetrical and will operate equally well for flows in either direction. If the direction of flow is unknown it can be easily ascertained by detecting the phase of the bridge output voltage.

Figure 5:
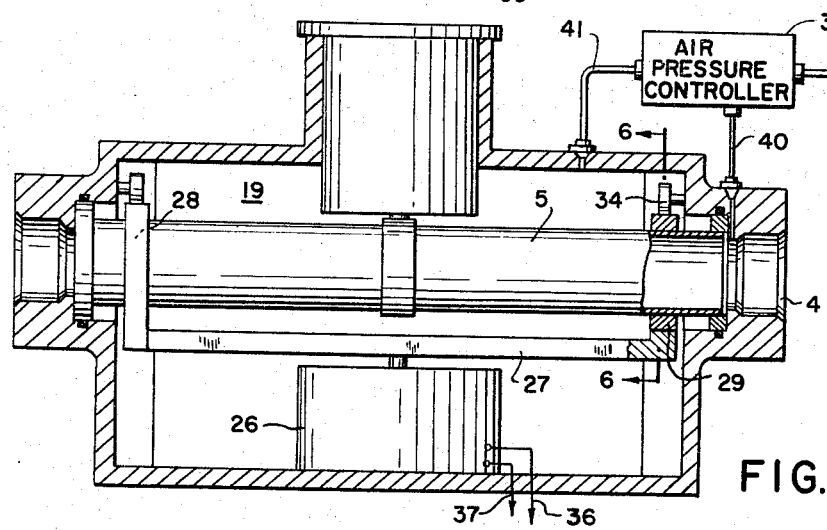
FIG. 5 is a view similar to FIG. 2 of an embodiment of the invention that includes force, feedback means to null the motion of the flow tube.
Figure 6:
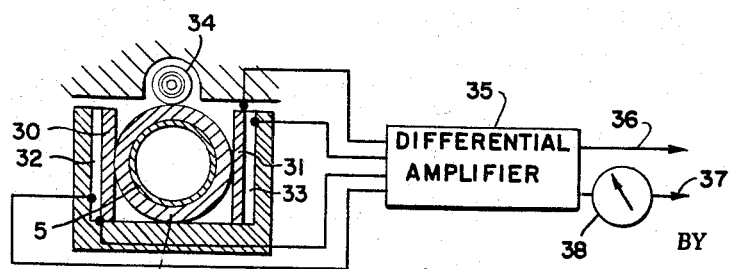
FIG. 6 is a framentary view along line 6—6 of FIG. 5 of one of the bearings and associated force error sensing elements for the flow tube shown in FIG. 5.

FIGS. 5 and 6 illustrate a variation of the embodiment shown in FIGS. 2, 3 and 4. The essential difference here is that the force couple due to oscillation of the mass flow is balanced by a moment from a torque motor to reduce the motion of the flow tube about its vertical center line, as sensed at the tube end bearings, to substantially zero. Except for the torque motor and attachment and the tube end bearings, the structure is substantially the same as that shown in FIG. 2.

The torque motor 26 applies a balancing moment about the vertical center line to flow tube 5 through a yoke 27 which retains the flow tube end bearings 28 and 29. FIG. 6 shows a section through the center of bearing 29. The cylindrical end bearing is free to rotate on the flow tube; but it is restrained from rolling laterally by plates 30 and 31 which abut against piezoelectric elements 32 and 33. The purpose of plates 30 and 31 is to distribute the reaction load evenly over the surfaces of the piezoelectric elements. When a force couple is present due to the oscillation of mass flow in the tube, bearing 29 attempts to roll back and forth in the transverse direction, alternately compressing piezoelectric elements 32 and 33. Bearing 29 is restrained in the vertical direction by ball bearing roller 34. The sellf-generated output voltages of the piezoelectric elements are fed to a high gain differential amplifier 35, whose output is an alternating current at oscillation frequency with an amplitude proportional to the bearing reaction force and a phase depending on the direction of the reaction force with respect to the oscillatory motion. The output current is fed to torque motor 26, through leads 36 and 37. The torque motor applies a moment in a direction to null the generated voltages of the piezoelectric elements; and, therefore, the actual motion of the flow tube about its vertical center line. The current supplied to the torque motor is measured by ammeter 38 as an indication of the restoring moment, hence mass flow rate.

It is not essential to have force sensing elements at each of the flow tube end bearings as long as the restraint of the non-sensing bearing is significantly more flexible than that of the sensing bearing. However, it is desirable to have the same sensing elements at both bearings so as to equalize restraints and to eliminate the effects of parallel forces at the bearings, as shown in FIGS. 2 and 4. FIGS. 5 and 6 show force sensing elements only at the right tube bearing for the sake of clarity; but it is to be understood that sensing elements can also be included at the left bearing without affecting the essential operation of the embodiment.

It has been found in similar apparatus of this type with flexible sections of a flow tube, that pressure equalization across the sections helps to stabilize the calibration by eliminating zero shifts and changes in sensitivity. (See my co-pending application 112,393, filed May 24, 1961, now U.S. Patent No. 3,218,851, issued Nov. 23, 1965.) An air pressure controller 39 is shown in FIG. 5. It receives a fluid pressure from port 4 through tube 40 and supplies a corresponding air pressure to chamber 19 through tube 41 so as to keep the pressure across the flow tube at zero or a low value.

Figure 8:
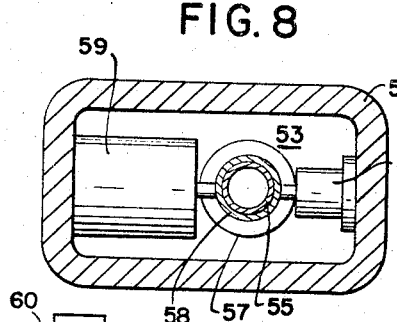
FIG. 8 is a sectional view of the embodiment shown in FIG. 7 along line 8—8.
Figure 7:
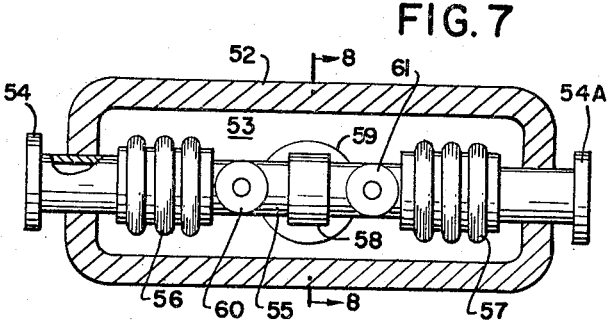
FIG. 7 is a side view of a further embodiment of the invention in part section.

In the embodiment shown in FIGS. 7 and 8 the mass flowmeter consists of a housing 52 with an internal chamber 53 and inlet and outlet pipes 54 and 54A. The vibrating flow tube, which is located within chamber 53, includes a straight, relatively rigid central section 55 and relatively flexible bellows 56 and 57 which connect section 55 to pipes 54 and 54A. Section 55 is held by central ring 58 so that it translates with ring 58 in a direction transverse to the flow path. Section 55 has a limited freedom to rotate within ring 58 about its vertical center line, such as can be attained by mounting section 55 on knife edges within ring 58 or on a circumferential row of balls. Ring 58 and section 55 are vibrated in a direction transverse to the flow path by electromagnetic driver 59. The motion of the ends of section 55 at its junctions with bellows 56 and 57 are sensed by magnetic vibration pickups 60 and 61. In operation ring 58 is vibrated at a constant value of vibrational velocity. Due to mass flow the inlet bellows will tend to lag the vibratory motion and the outlet bellows will tend to lead the vibratory motion, causing flow tube section 55 to rotate about its vertical center line. The differential motion of the ends of section 55 causes a difference in outputs between vibration pickups 60 and 61; and this difference can be measured to provide an indication of mass flow.

Figure 9:
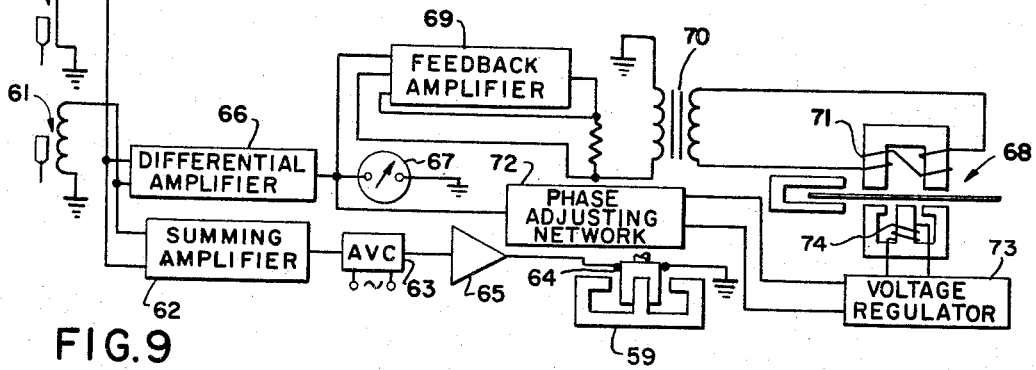
FIG. 9 is a wiring diagram of the electrical components shown in FIGS. 7 and 8.

Referring now to the electrical schematic diagram of FIG. 9, the additive output of the two sensors 60 and 61 is fed to summing amplifier 62. The output voltage of summing amplifier 62 is limited in value by automatic voltage control 63, which feeds coil 64 of electromagnetic driver 59 through amplifier 65 so as to maintain the amplitude of vibrational velocity of the driver constant.

The differential output of the two sensors 60 and 61 is also fed to a differential voltage amplifier 66, whose output in turn is fed to a voltmeter 67, calibrated to indicate mass rate of flow. The electrical components include a conventional induction type of watt-hour meter 68 for indicating the total mass flow through the meter from a given reference time. The alternating output of amplifier 66 is also fed to feedback amplifier 69 whose output is a current proportional to the output voltage of amplifier 66, hence to mass flow rate. This current is fed to a current transformer 70, whose output, a much larger current but still proportional to mass flow rate, is fed to the current coil 71 of the watt-hour meter. The alternating output of the differential voltage amplifier 66 is also fed to a phase adjusting network 72, whose output is delivered to an AC voltage regulator 73, which supplies an alternating voltage at vibration frequency of constant amplitude and in proper phase relation with the current in the current coil 71 to the voltage coil 74 of the watt-hour meter. The current transformer 70 is not essential; but it is desirable for use with industrial watt-hour meters, which have relatively high capacities in comparison with the outputs of instrument amplifiers. The phase adjusting network 72 and voltage regulator 73 can be of any known design. Their inclusion is essential for assurance of high accuracy performance of the watt-hour meter compatible with the accuracy of the metering means.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Means for metering the mass of matter flowing in a line including a fixed member in the line having axially spaced coaxial inlet and outlet ports, a straight conduit providing an unrestrictive rectilinear path for the flow of matter in the line along the axis mounted on the member to move along an input axis normal to the flow path to provide a force couple due to the flowing matter about a couple axis coplanar with the input axis and normal to the input axis and the flow path, means for vibrating the conduit in the direction of the input axis to impart transverse momentum to the matter flowing therein, and output means for sensing the force couple on the conduit about the couple axis due to the transverse momentum of the flowing matter as a measure of the mass of matter flowing through the conduit.

2. Metering means of the character claimed in claim 1 in which the conduit is a relatively flexible tube.

3. Metering means of the character claimed in claim 1 in which the conduit is a relatively rigid tube.

4. Metering means of the character claimed in claim 1 including means of connecting the inlet port to the inlet end of the conduit, and means connecting the outlet port to the outlet end of the conduit.

5. Metering means of the character claimed in claim 1 in which the conduit vibrating means operates to vibrate the conduit at a constant amplitude of vibrational velocity.

6. Metering means of the character claimed in claim 1 in which the conduit vibrating means vibrates the conduit at its resonant frequency.

7. Metering means of the character claimed in claim 1, in which the output means includes means for applying a force couple on the conduit equal and opposite to the sensed force couple.

8. Metering means of the character claimed in claim 1, in which the fixed member includes a pressurizable chamber and the conduit is located within said chamber.

9. Metering means of the character claimed in claim 8 including pressure controlling means to maintain the pressure in the chamber at a fixed relation to the pressure in the conduit.

10. Metering means of the character claimed in claim 1 in which the upstream end of the conduit is mounted in an upstream bearing, the downstream end of the conduit is mounted in a downstream bearing, the vibrating means includes a movable part connected to the conduit midway between the bearings, and the output means includes means for sensing the transverse forces on the bearings due to the motion of the vibrating means.

11. Metering means of the character claimed in claim 10 in which the output means senses the differential of transverse forces on the bearings.

12. Means for metering the mass of matter flowing in a line including a fixed member in the line having axially spaced coaxial inlet and outlet ports, a straight conduit between the ports, flexibly connected with the inlet and outlet ports, means for vibrating the conduit along an axis transverse to its flow axis to provide a force couple on the conduit about an axis coplanar with the vibration axis and normal to the vibration axis and the flow axis due to fluid flow through the conduit, and means for sensing said force couple as a measure of the mass of matter flowing through the conduit.

13. Metering means of the character claimed in claim 12 in which the conduit is a tube made of relatively flexible material.

14. Metering means of the character claimed in claim 12 in which the conduit is a relatively rigid tube connected to the inlet and outlet ports by flexible members.

15. Metering means of the character claimed in claim 12 in which the sensing means includes means for exerting a moment on the conduit about the couple axis equal and opposed to the force couple.

16. Metering means of the character claimed in claim 1 in which the force sensing means has an output which is a voltage proportional to rate of mass flow through the conduit.

17. Metering means of the character claimed in claim 16 including an induction watt-hour meter having a current coil and a voltage coil, means for applying an electric current proportional to the voltage output of the force sensing means to the current coil, means for applying a voltage of the same frequency as the current applied to the current coil to the voltage coil, voltage regulating means to maintain the voltage on the voltage coil at a constant value, phase adjusting means to correct the phase between the voltage on the voltage coil and the current in the current coil, said watt-hour meter indicating total mass flow through the conduit.

References Cited

UNITED STATES PATENTS 3,080,750   3/1963   Wiley et al. _____ 73—194

RICHARD C. QUEISSER, *Primary Examiner.*

E. D. GILHOOLY, *Assistant Examiner.*